United States Patent
Komiya et al.

(10) Patent No.: US 9,240,678 B2
(45) Date of Patent: Jan. 19, 2016

(54) ELECTRICAL JUNCTION BOX

(71) Applicant: Yazaki Corporation, Tokyo (JP)

(72) Inventors: Yuki Komiya, Makinohara (JP); Hideki Kawamura, Makinohara (JP); Hiroki Tashiro, Makinohara (JP)

(73) Assignee: Yazaki Corporation, Tokyo (JP)

( * ) Notice: Subject to any disclaimer, the term of this patent is extended or adjusted under 35 U.S.C. 154(b) by 156 days.

(21) Appl. No.: 14/108,556

(22) Filed: Dec. 17, 2013

(65) Prior Publication Data

US 2014/0168863 A1    Jun. 19, 2014

(30) Foreign Application Priority Data

Dec. 19, 2012  (JP) .................................. 2012-276533

(51) Int. Cl.
    *H02B 1/26*    (2006.01)
    *H02G 3/08*    (2006.01)
    *H01R 12/00*   (2006.01)

(52) U.S. Cl.
    CPC . *H02G 3/08* (2013.01); *H01R 12/00* (2013.01)

(58) Field of Classification Search
    CPC ............... B60R 16/0238–16/0239; H02G 3/08
    See application file for complete search history.

(56) References Cited

U.S. PATENT DOCUMENTS

2013/0025930 A1* 1/2013 I. et al. .......................... 174/520
2013/0034974 A1* 2/2013 Akahori et al. ............... 439/76.2

FOREIGN PATENT DOCUMENTS

JP        2001-211528 A    8/2001

* cited by examiner

*Primary Examiner* — Gregory Thompson
(74) *Attorney, Agent, or Firm* — Locke Lord LLP; James E. Armstrong, IV; Brian S. Matross (57) ABSTRACT

There is provided an electrical junction box which can improve rigidity of a case body. An electrical junction box includes a block, a case body and an inner cover which regulates a wiring path of an electric wire attached to the block. The case body is formed into a deep box-like shape having a peripheral wall, a bottom wall and an opening portion, wherein a portion of the case body adjacent to the bottom wall has a tapered shape. Cutout portions are formed at two opposing faces of the peripheral wall. A width of the cutout portion is smaller when the case body is in a natural condition in which the block is not housed in the case body than when the block is housed in the case body. The width of the cutout portion is broadened as the block is inserted into the case body.

2 Claims, 8 Drawing Sheets

ELECTRICAL JUNCTION BOX

CROSS-REFERENCE TO RELATED APPLICATIONS

This application is based on Japanese Patent Application No. 2012-276533 filed on Dec. 19, 2012, the contents of which are hereby incorporated by reference.

TECHNICAL FIELD

The present invention relates to an electrical junction box to be mounted on an automobile.

BACKGROUND ART

An automobile is mounted with an electrical junction box. There are various electrical junction boxes of various structures. One known example of such electrical junction box includes an inner cover, as shown in FIG. 8 (refer to PLT 1).

Figure 8:
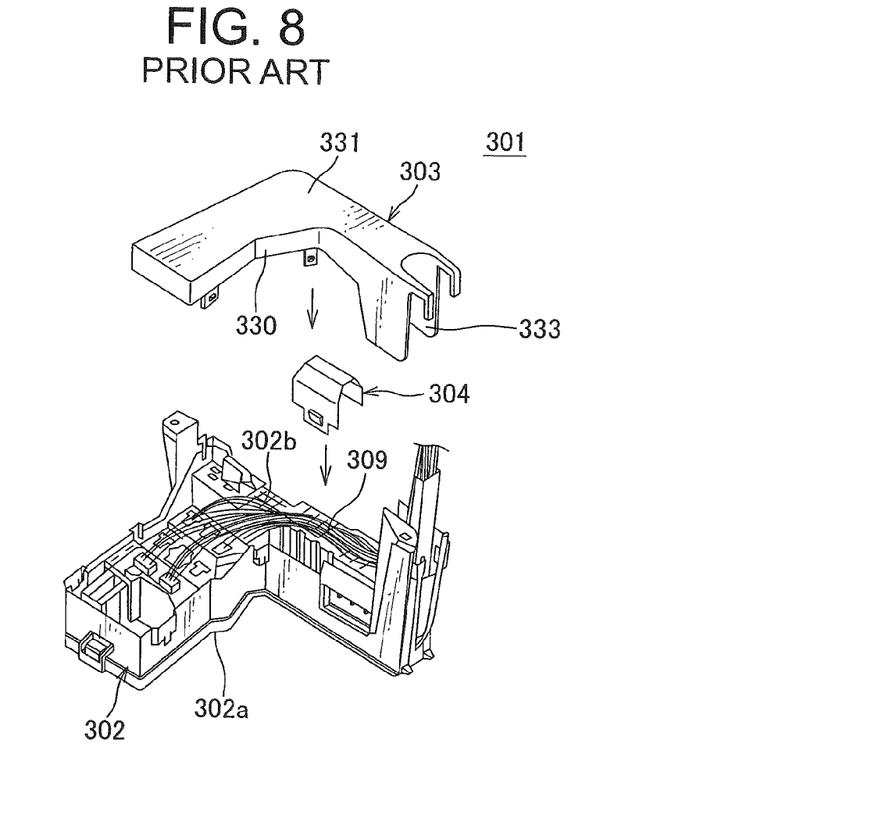
FIG. 8 is an exploded view of a conventional electrical junction box.

As shown in FIG. 8, an electrical junction box 301 includes a block 302 to which a relay and a fuse are to be attached on the side of an upper face 302a and to which an electric wire 309 is to be attached on the side of a lower face 302b, an undercover 303 arranged to be attached on the side of the lower face 302b of the block, and an inner cover 304 arranged to be attached on the side of the lower face 302b of the block 302 to regulate a wiring path of the electric wires 309.

The undercover 303 includes a peripheral wall 330 and a flat bottom wall 331. A cutout portion 333 for drawing out the electric wires 309 is formed on one face of the peripheral wall 330 and on the bottom wall 331.

The inner cover 304 holds the electric wires 309 between the lower face 302b of the block 302 and the inner cover 304 and thereby regulates the electric wires 309 not to protrude outward from the side face of the block 302. Thus, when the undercover 303 is to be attached to the lower face 302b of the block 302, the inner cover 304 prevents the electric wires 309 from being caught between the side face of the block 302 and the peripheral wall 330 of the undercover 303.

CITATION LIST

Patent Literature

PTL 1: Japan Patent Application Publication No. 2001-211528

SUMMARY OF INVENTION

For the electrical junction box 301 mentioned above, the depth of the undercover 303 is shallow. However, shapes of the electrical junction boxes vary due to a limitation in shape and space of a mounting location in an automobile, and thus it is difficult to improve the rigidity of the electrical junction box. Especially, due to the above-mentioned limitation, there may be an electrical junction box having a case body having a deep depth for housing a block; but in such electrical junction box, it is difficult to improve the rigidity of the case body.

Furthermore, in the electrical junction box 301 mentioned above, the cutout portion 331 is formed only at the one face of the peripheral wall 330 and the bottom wall 331 of the undercover 303. However, there is another electrical junction box in which a cutout portion is formed at two opposing faces of a peripheral wall of a case body for housing a block. Such electrical junction box has a problem that, other faces of the peripheral wall angled with respect to said two faces provided with the cutout portion are slanted toward the cutout portion, causing it difficult to insert the block into the case body. Moreover, even if no cutout portion is provided, if the case body has a small opening or if the peripheral wall is deformed, it is difficult to insert the block into the case body.

Therefore, a first object of the present invention is to provide an electrical junction box which can improve the rigidity of a case body, and a second object of the present invention is to provide an electrical junction box which can improve the rigidity of a case body and which can facilitate insertion of a block into the case body.

To achieve the first object, the present invention provides, in a first aspect, an electrical junction box including: a block to which a plurality of components is attached; a case body arranged to house the block; and an inner cover arranged to be attached to the block to regulate a wiring path of an electric wire attached to the block, wherein the case body is formed into a box-like shape having a peripheral wall, a bottom wall and an opening portion, and wherein the inner cover is formed into a shape that follows an inner face of the case body.

To achieve the second object, the present invention provides, in a second aspect, the electrical junction box described above, wherein the inner cover is formed into a tapered shape having a width which decreases toward the bottom wall.

Furthermore, the present invention provides, in a third aspect, the electrical junction box described above, wherein cutout portions are formed at two opposing faces of the peripheral wall of the case body, the cutout portion being concave from an end of the peripheral wall adjacent to the opening portion toward the bottom wall, wherein a width of the cutout portion is smaller when the case body is in a natural condition in which the block is not housed in the case body than when the case body is in a condition in which the block is housed in the case body, and wherein the width of the cutout portion is broadened as the block is inserted into the case body.

According to the first aspect described above, by arranging the inner cover along the inner face of the case body so two faces are overlapped each other, the rigidity of the case body can be improved.

According to the second aspect described above, the inner cover is formed into the tapered shape. Thus, when inserting the block into the case body, a distal end portion of the inner cover having the tapered shape can be caught in the opening portion of the case body, thus the block can be easily inserted into the case body.

According to the third aspect described above, when inserting the block into the case body, the distal end portion of the inner cover having the tapered shape can be caught in the narrowed opening portion of the case body, thus the block can be easily inserted into the case body while correcting the slant of the peripheral wall of the case body.

DESCRIPTION OF EXEMPLARY EMBODIMENTS

In the following, an electrical junction box according to one embodiment of the present invention is explained in reference to FIGS. 1 through 7. The electrical junction box is arranged to be mounted on an automobile to supply power and transmit signal to an electronic device mounted on the automobile.

Figure 1:
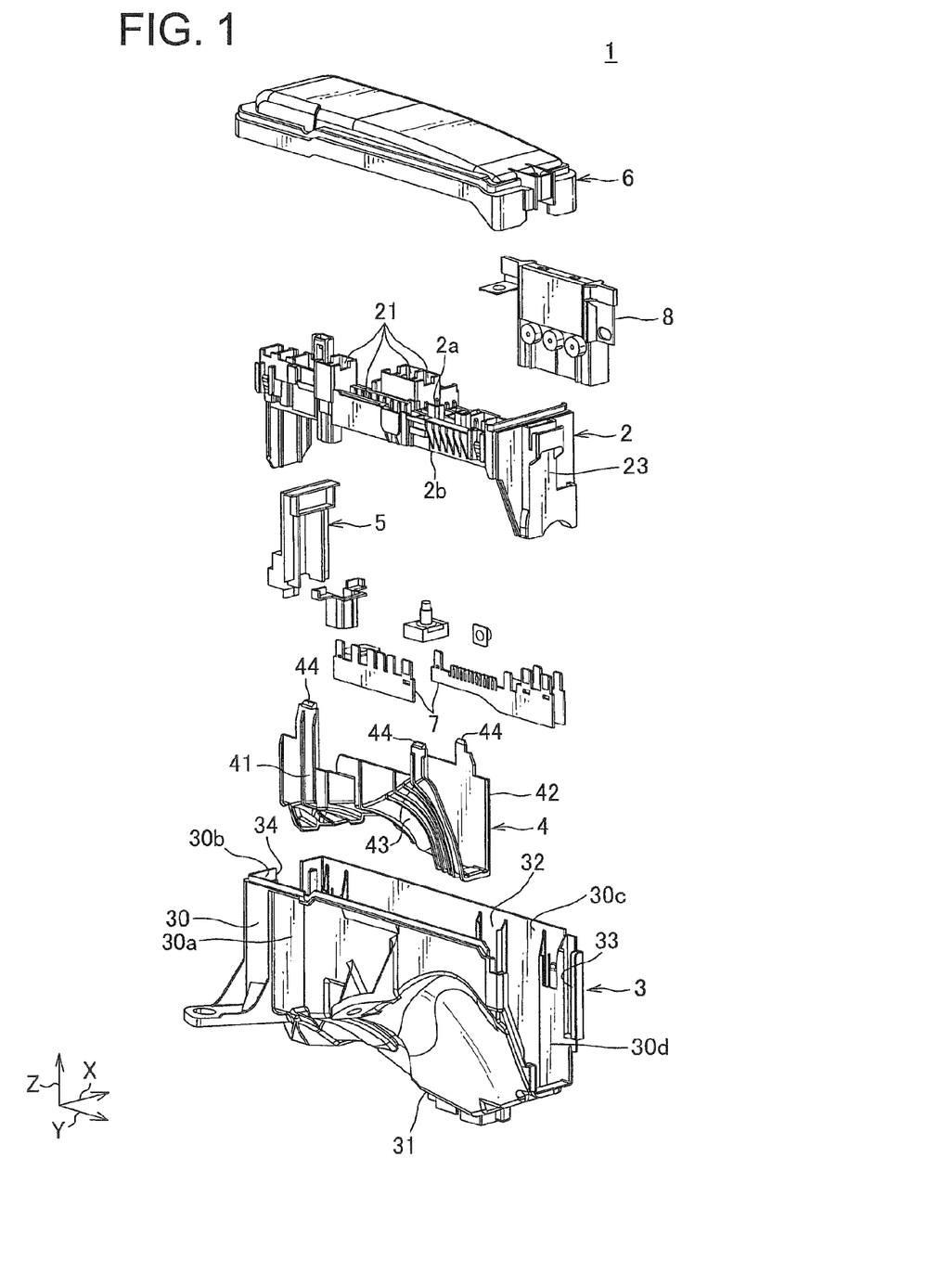
FIG. 1 is an exploded view of an electrical junction box according to one embodiment of the present invention.

Referring to FIG. 1, an electrical junction box 1 includes a block 2 to which a plurality of components such as a bus bar 7, a relay, a fuse and a fusible link is attached, a case body 3 arranged to house the block 2, an inner cover 4 arranged to be attached to the block 2 to regulate a wiring path of an electric wire 9 (indicated by a dotted line in FIG. 2) attached to the block 2, a side cover 5, and an upper cover 6. The block 2, the case body 3, the inner cover 4, the side cover 5 and the upper cover 6 are made of synthetic resin.

In FIG. 1, an arrow Z is indicative of a depth (i.e. height) direction the case body 3, an arrow Y is indicative of a longitudinal direction of the case body 3, and an arrow X is indicative of a short-side direction of the case body 3.

Figure 2:
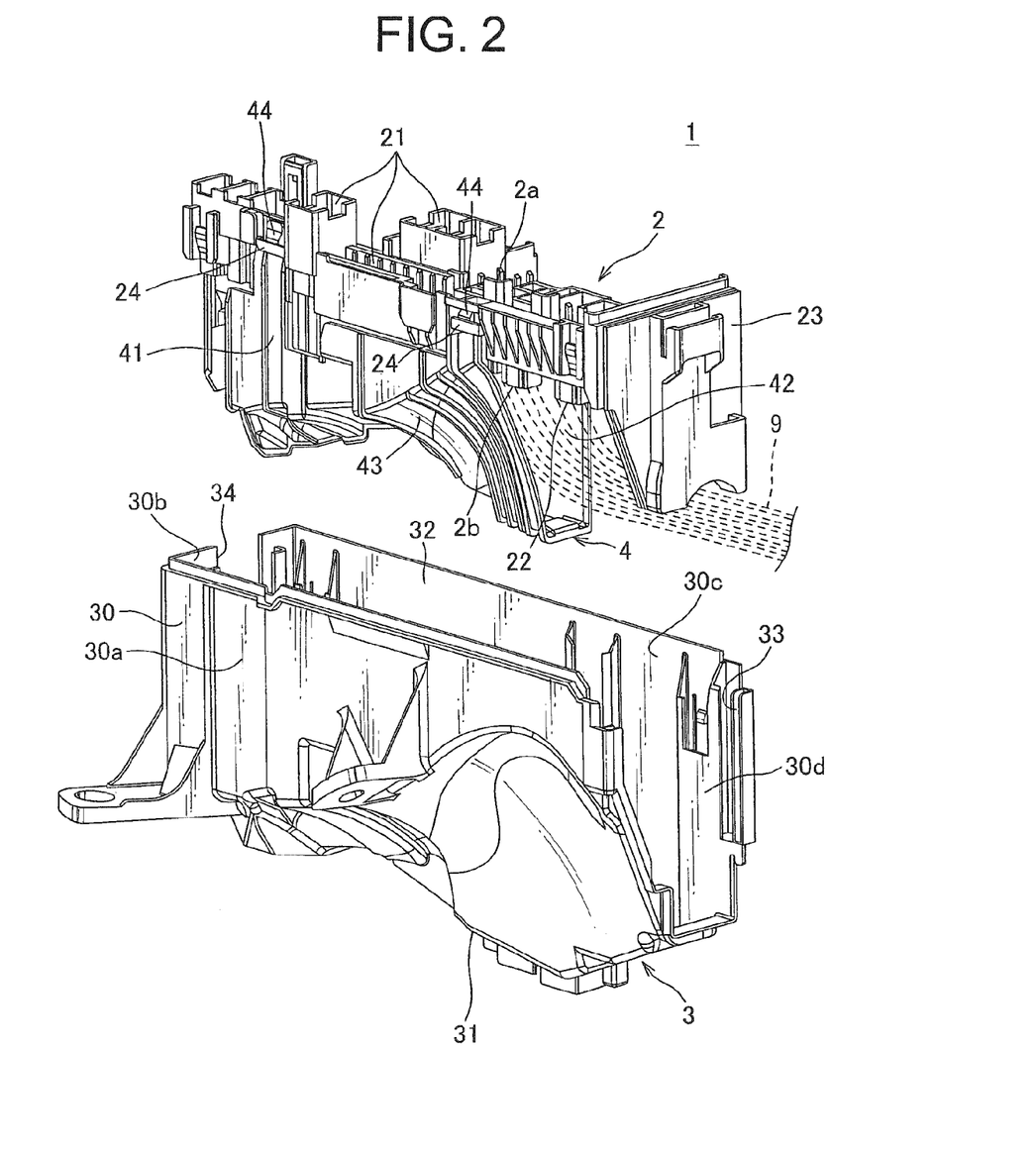
FIG. 2 is a perspective view showing a condition in which an inner cover is attached to a block shown in FIG. 1.

The block 2 includes an upper face 2a having a component attachment portion 21 to which a component such as the relay, the fuse and the fusible link 8 is attached, and a lower face 2b having a bus bar insertion groove and an electric wire attachment portion 22 (shown in FIG. 2). Furthermore, a cover portion 23 is provided to one side face of the block 2 located in the longitudinal direction (i.e. the Y direction), the cover portion 23 being arranged to be placed in a cutout portion 33 of the case body 3. Furthermore, an engagement portion 24 (shown in FIG. 2) to which a claw portion 44 of the inner cover 4 is engaged is provided at a side face of the block 2 located in the short-side direction (i.e. the X direction).

The case body 3 is formed into a deep box-like shape including a tubular peripheral wall 30, a bottom wall 31 and an opening portion 32 having a rectangular shape in a planar view. The peripheral wall 30 includes four faces, i.e. two faces 30a, 30c that are parallel and opposed to each other in the X direction and other two faces 30b, 30d that are parallel and opposed to each other in the Y direction. The two faces 30a, 30b define the long sides of the opening portion 32, and the other two faces 30b, 30d define the short sides of the opening portion 32. The two faces 30b, 30d are provide with cutout portions 33, 34 which are concave from an end of the peripheral wall 30 adjacent to the opening portion 32 toward the bottom wall 31. One of the cutout portions 33 is formed by cutting out substantially an entire area of the face 30d. These cutout portions 33, 34 are arranged to draw out the electric wires 9. Furthermore, the case body 3 is formed into a tapered shape such that the width of the case body 3 on the side of the bottom wall 31 becomes narrower with distance from the opening portion 32.

Figure 7:
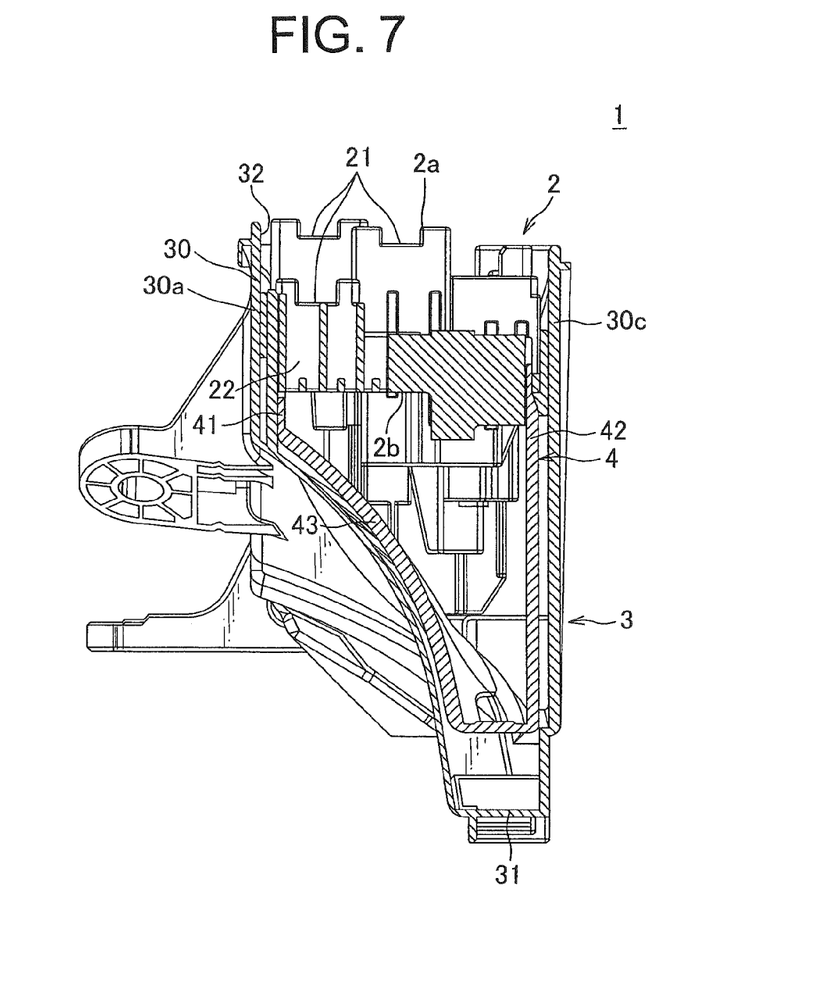
FIG. 7 is a cross-sectional view of the block, the inner cover and the case body shown in FIG. 4.

As shown in FIG. 1 and FIG. 7, the inner cover 4 includes a first parallel portion 41 arranged along the face 30a of the peripheral wall 30 of the case body 3, a second parallel portion 42 arranged along the face 30c of the peripheral wall 30, a bottom portion 43 arranged along the bottom wall 31 and having a tapered shape, and the claw portion 44 arranged to engage with the engagement portion 24 of the block 2. In this manner, the inner cover 4 is formed into a tapered shape that follows an inner face of the case body 3. The inner cover 4 regulates the electric wires 9 not to protrude out from the side face of the block 2 by positioning the electric wires 9 between the inner cover 4 and the lower face 2b of the block 2. Thus, when the block 2 is being inserted into the case body 3, the inner cover 4 prevents the electric wires 9 from being caught between the side face of the block 2 and the peripheral wall 30 of the case body 3. Furthermore, the inner cover 4 helps to increase the rigidity of the case body 3 by being arranged along the inner face of the case body 3.

Figure 4:
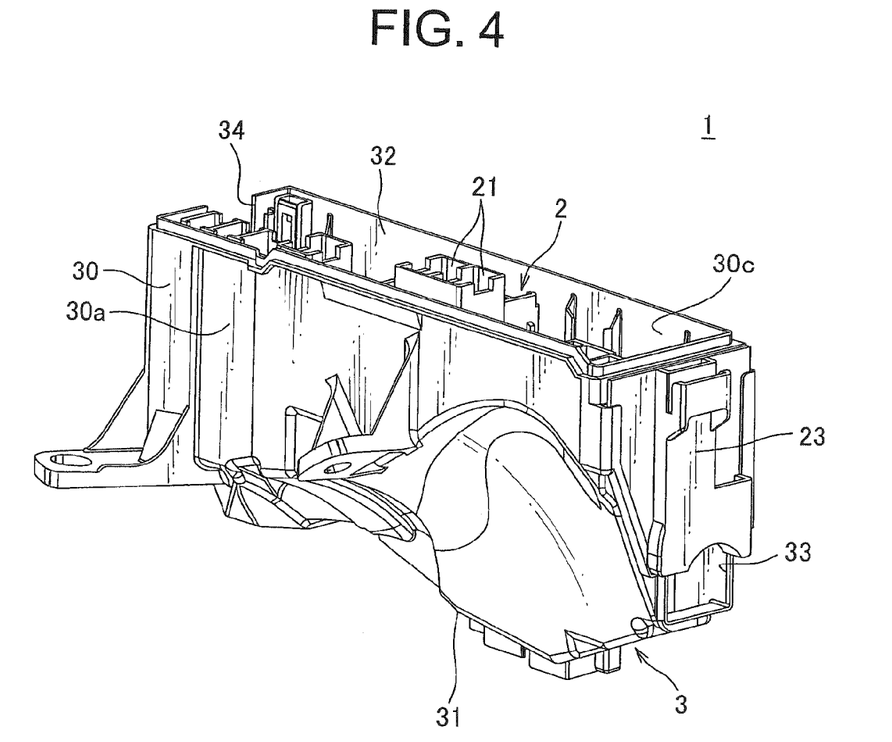
FIG. 4 is a perspective view showing a condition in which the block and the inner cover shown in FIG. 3 are completely housed in the case body.

The side cover 5 is placed at the cutout portion 34 of the case body 3 after the block 2 is housed in the case body 3. As shown in FIG. 4, the cover portion 23 and the side cover 5 partially cover the cutout portions 33, 34 while leaving a space necessary for drawing out the electric wires 9. In FIG. 4, the electric wires 9 are not shown, although in practice the electric wires 9 are drawn out from the cutout portions 33, 34 in the condition shown in FIG. 4.

The upper cover 6 covers the opening portion 32 of the case body 3 after the block 2 is housed in the case body 3.

Figure 5:
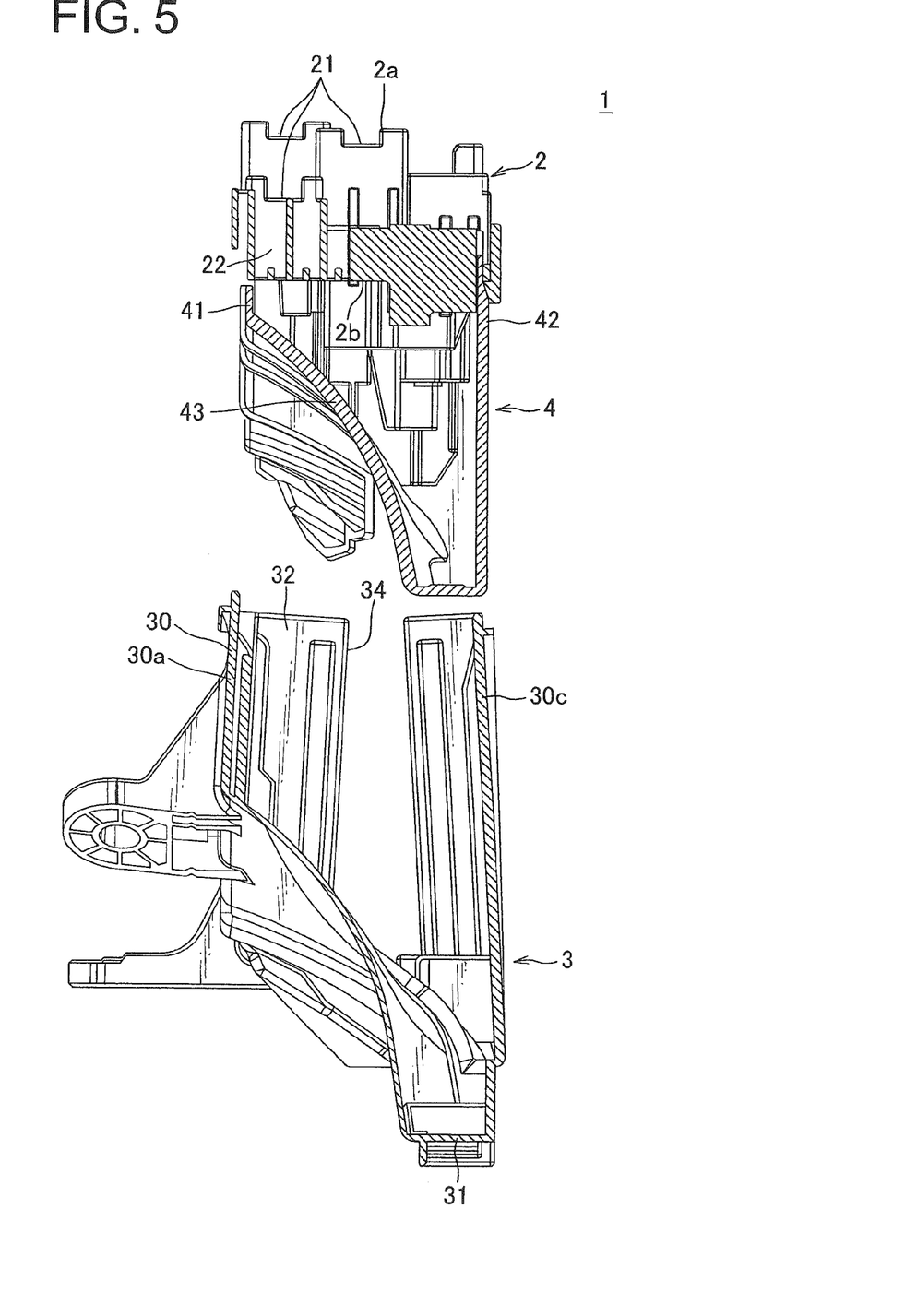
FIG. 5 is a cross-sectional view of the block, the inner cover and the case body shown in FIG. 2.

Next, a method for assembling the electrical junction box 1 described above is explained. Firstly, the components such as the bus bar 7, the relay, the fuse and the fusible link 8 as well as the electric wires 9 are attached to the block 2. Then, as shown in FIG. 2 and FIG. 5, the inner cover 4 is attached to the lower face 2b side of the block 2.

Figure 3:
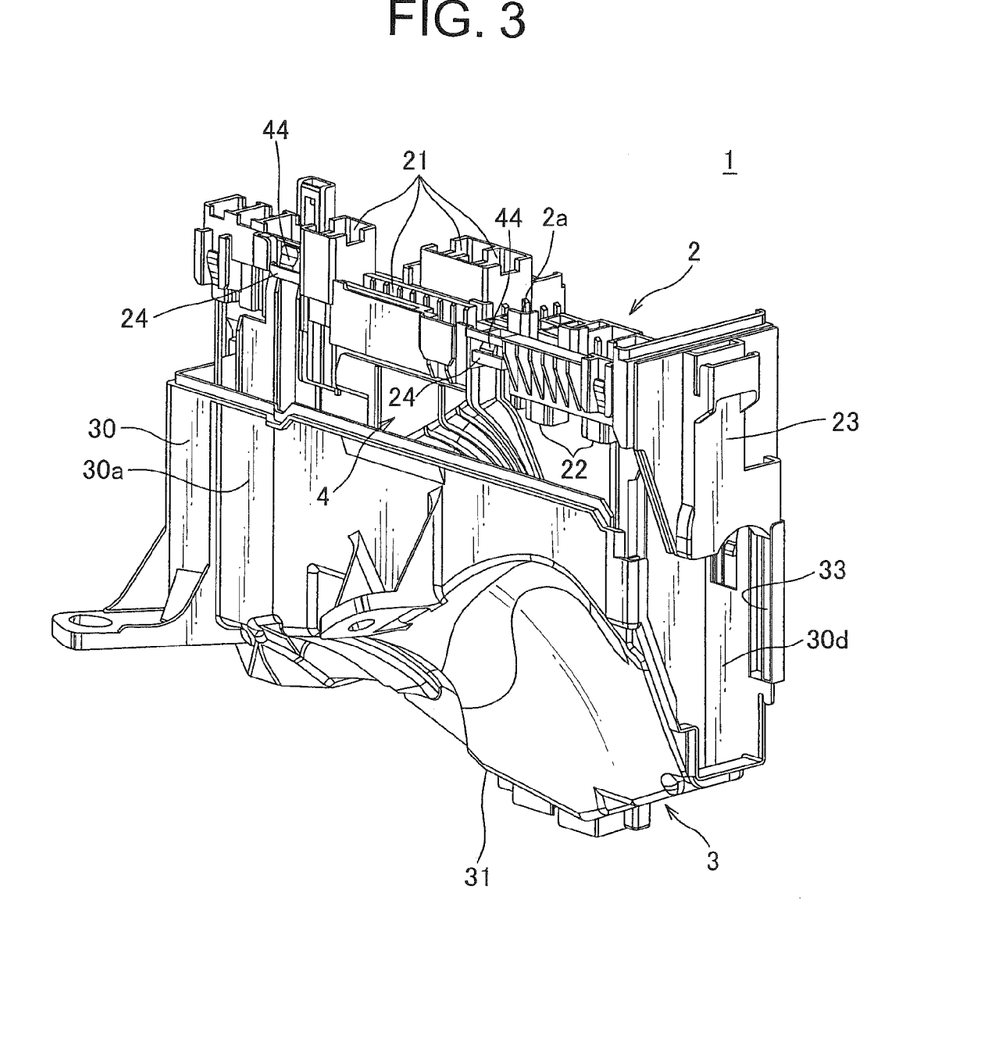
FIG. 3 is a perspective view showing a condition in which the block and the inner cover shown in FIG. 2 are being inserted into a case body.
Figure 6:
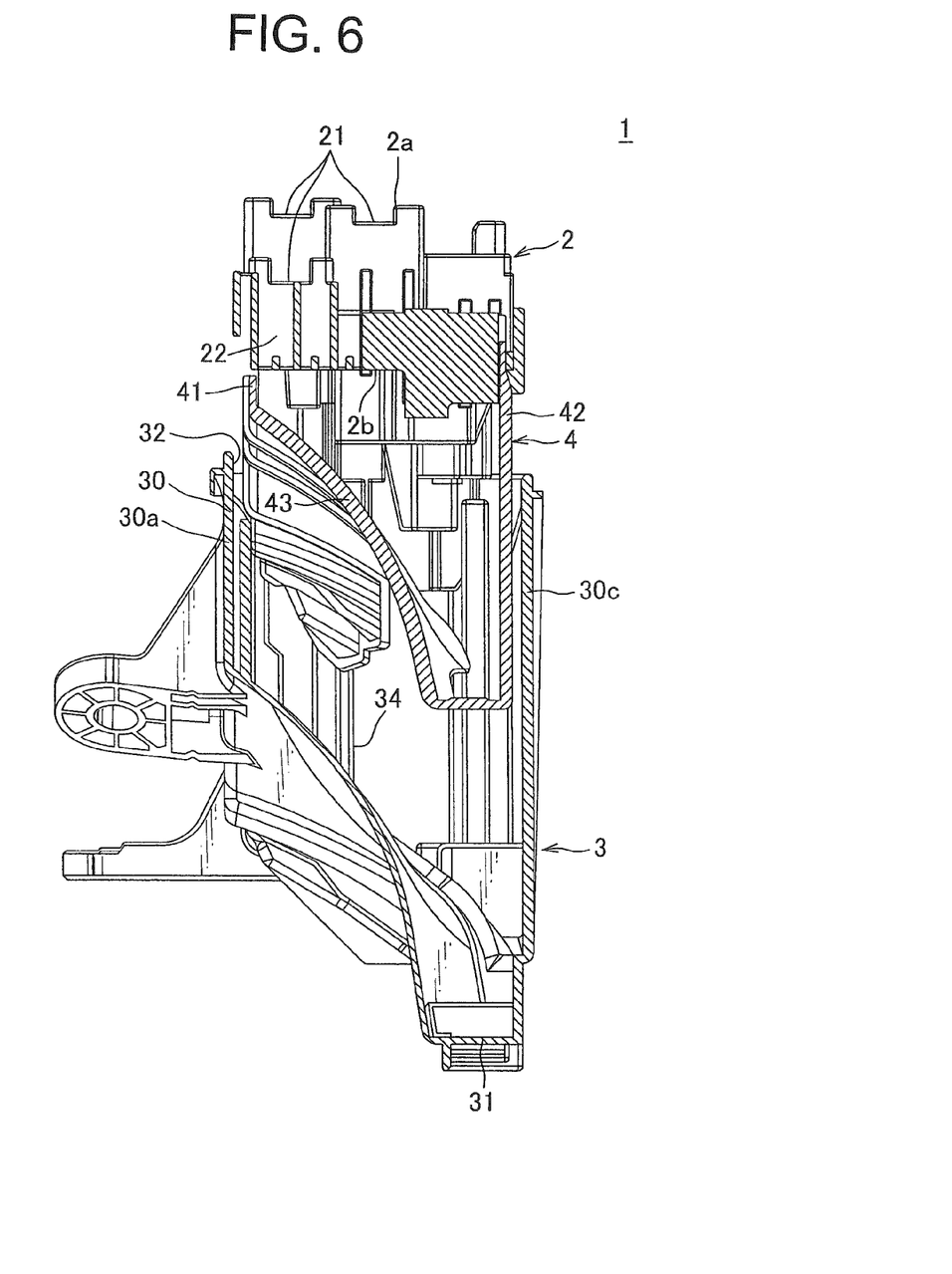
FIG. 6 is a cross-sectional view of the block, the inner cover and the case body shown in FIG. 3.

Next, as shown in FIG. 3 and FIG. 6, the block 2 and the inner cover 4 are inserted into the case body 3. Here, as shown in FIG. 5, the widths of the cutout portions 33, 34 are smaller when the case body 3 is in a natural condition, i.e. when the block 2 is not housed in the case body 3, than when the block 2 is housed in the case body 3. That is, the two faces 30a, 30c of the peripheral wall 30 are slanted toward the cutout portions 33, 34 (i.e. slanted inward) narrowing the opening portion 32. In the present invention, when inserting the block 2 and the inner cover 4 into such case body 3, a distal end portion of the inner cover 4 (i.e. the bottom portion 43 formed into the tapered shape) can be caught into the narrowed opening portion 32 of the case body 3 first, thus the block 2 can be easily inserted into the case body 3 while correcting the slant of the two faces 30a, 30c of the peripheral wall 30, i.e. while broadening the width of the cutout portions 33, 34.

By housing the block 2 and the inner cover 4 in the case body 3, the inner cover 4 is placed along the inner face of the case body 3, as shown in FIG. 4 and FIG. 7, thereby increasing the rigidity of the case body 3. Also, by housing the block 2 and the inner cover 4 in the case body 3, the electric wires 9 can be drawn out of the case body 3 through the cutout portions 33, 34 without being caught between the block 2 and the case body 3.

Next, the side cover 5 is attached to the cutout portion 34 of the case body 3, and the upper cover 6 is attached to the opening portion 32 of the case body 3, thereby completing the assembling of the electrical junction box 1.

The embodiments described herein are only representative embodiments of the present invention, and the present invention is not limited to these. That is, the present invention can be modified and implemented in various ways without departing from the gist of the present invention.

REFERENCE SIGN LIST 1 electrical junction box
2 block
3 case body
4 inner cover

9 electric wire
30 peripheral wall
31 bottom wall
32 opening portion
33, 34 cutout portion

The invention claimed is:

1. An electrical junction box comprising:
a block to which a plurality of components is attached;
a case body arranged to house the block; and
an inner cover arranged to be attached to the block to regulate a wiring path of an electric wire attached to the block,
wherein the case body is formed into a box-like shape having a peripheral wall, a bottom wall and an opening portion, and
wherein the inner cover is formed into a tapered shape having a width which decreases toward the bottom wall and follows an inner face of the case body.

2. The electrical junction box according to claim 1,
wherein cutout portions are formed at two opposing faces of the peripheral wall of the case body, the cutout portions being concave from an end of the peripheral wall adjacent to the opening portion toward the bottom wall,
wherein a width of each cutout portion is smaller when the case body is in a natural condition in which the block is not housed in the case body than when the case body is in a condition in which the block is housed in the case body, and
wherein the width of each cutout portion is broadened as the block is inserted into the case body.

\* \* \* \* \*